United States Patent [19]

Moffett

[11] 3,718,646
[45] Feb. 27, 1973

[54] N-LOWER ALKENYL-2,3-DIHYDRO-2-OXO-5-PHENYL-1H-1,4-BENZODIAZEPINE-1-CARBOXAMIDES

[75] Inventor: Robert B. Moffett, Kalamazoo, Mich.

[73] Assignee: The Upjohn Company, Kalamazoo, Mich.

[22] Filed: Oct. 5, 1970

[21] Appl. No.: 78,167

[52] U.S. Cl. ..........................260/239.3 D, 424/244
[51] Int. Cl. ..........................................C07d 53/06
[58] Field of Search ........................260/239.3 D

[56] References Cited

UNITED STATES PATENTS 3,236,838  2/1966  Archer et al. .....................260/239.3

OTHER PUBLICATIONS

Chemical Abstracts, Vol. 72, Item 132810k (1970) Abstracting Japanese Patent 70 06,544, Mar. 5, 1970
Chemical Abstracts, Vol. 71, Item 39021y (1969) Abstracting South African Patent 68 01,890, Nov. 4, (1968)

*Primary Examiner*—Henry R. Jiles
*Assistant Examiner*—Robert T. Bond
*Attorney*—Hans L. Berneis and John Kekich

[57] ABSTRACT

A 2,3-dihydro-2-oxo-5-phenyl-1H-1,4-benzodiazepin-1-carboxamide of the formula:

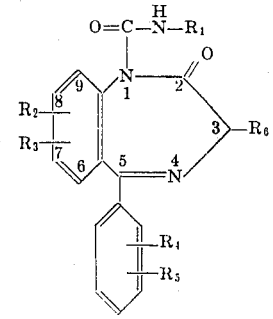

thereof,
wherein $R_1$ is alkenyl of three to eight carbon atoms, inclusive, cycloalkyl of three to six carbon atoms, inclusive, and haloalkyl, in which the alkyl group is of two to six carbon atoms, inclusive and the halogen is fluorine, chlorine, bromine, or iodine; wherein $R_2$, $R_3$, $R_4$, and $R_5$ are selected from the group consisting of hydrogen, alkyl of one to three carbon atoms, inclusive, fluorine, chlorine, bromine, cyano and trifluoromethyl, and wherein $R_6$ is hydrogen or alkyl of one to three carbon atoms, inclusive, and the pharmacologically acceptable acid addition salts thereof, are prepared by reacting a compound of the structure

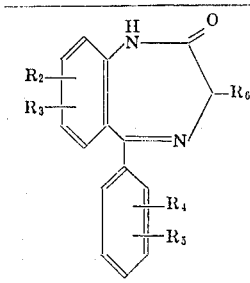

wherein $R_2$, $R_3$, $R_4$, $R_5$, and $R_6$ have the values of above, with an alkenyl, cycloalyl, or haloalkyl isocyanate. The products of formula II are useful as tranquilizers and sedatives.

7 Claims, No Drawings

N-LOWER ALKENYL-2,3-DIHYDRO-2-OXO-5-PHENYL-1H-1,4-BENZODIAZEPINE-1-CARBOXAMIDES

BACKGROUND OF THE INVENTION

FIELD OF THE INVENTION

This invention is directed to new organic compounds and is particularly concerned with novel $N^1$-substituted-2,3-dihydro-2-oxo-5-phenyl-1H-1,4-benzodiazepin-1-carboxamide, the pharmacologically acceptable acid addition salts thereof, and a process therefor.

The novel products and the process therefor can be illustratively represented in the following manner:

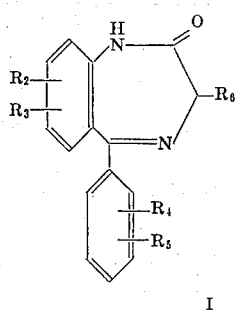 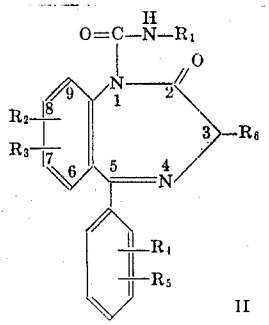

wherein $R_1$ is selected from the group consisting of alkenyl of three to eight carbon atoms, inclusive, cycloalkyl of three to six carbon atoms, inclusive, and haloalkyl in which the alkyl group is of two to six carbon atoms, inclusive, and the halogen is fluorine, chlorine, bromine, or iodine; wherein $R_2$, $R_3$, $R_4$, and $R_5$ are selected from the group consisting of hydrogen, lower-alkyl of one to three carbon atoms, inclusive, fluorine, chlorine, bromine, cyano and trifluoromethyl; and wherein $R_6$ is hydrogen or alkyl of one to three, carbon atoms, inclusive.

The process of this invention comprises: treating a 1,3-dihydro-2-oxo-5-phenyl-2H-1,4-benzodiazepine (I) with a reagent selected from the group consisting of alkyl isocyanate, a haloalkyl isocyanate and a cycloalkyl isocyanate, in an inert organic solvent, to give the carboxamide of formula II above.

The compounds of formula II are converted to acid addition salts by reacting the carboxamide with the stoichiometrically calculated amount of acid, i.e., one equivalent compound II to one equivalent of acid. Preferably, the reaction is carried out in a water-free medium and with water-free acid, e.g., hydrogen chloride, or hydrogen bromide dissolved in methanol or ethanol. Other useful acids are sulfuric, acetic, tartaric, lactic, maleic, citric, and cyclohexanesulfamic acid.

DESCRIPTION OF THE PREFERRED EMBODIMENT

Lower alkyl groups of one to three carbon atoms comprise methyl, ethyl, propyl, and isopropyl.

Lower alkenyl groups of three to eight carbon atoms illustratively includes allyl, crotonyl, 3-penten-1-yl, 2-penten-1-yl, 2-hexen-1-yl, 3-hexen-1-yl; 4-hexen-1-yl; 3-hepten-1-yl; 5-octen-1-yl; 2-methyl-3-hepten-1-yl; 3-octen-2-yl; 4-hexen-3-yl, and the like.

Lower haloalkyl groups of two to six carbon atoms are 2-chloroethyl, 2-chlorpropyl, 4-chlorbtyyl, 5-bromopentyl, 4-iodopentyl, 3-fluoropropyl, 3-bromohexyl, 5-chloropentyl, 2-iodoethyl, and the like.

The cycloalkyl groups herein used are cyclopropyl, cyclubutyl, cyclopentyl, and cyclohexyl.

The novel compounds of the formula II including acid addition salts thereof have sedative, tranquilizing and muscle relaxant effect in mammals and birds.

The acid addition salts of compounds of formula II contemplated in this invention, are the hydrochlorides, hydrobromides, hydroiodides, sulfates, phosphates, cyclohexanesulfamates, acetates, lactates, tartrates, citrates, methanesulfonates, and the like, prepared by reacting a compound of formula I with the stoichiometrically calculated amount of selected pharmacologically acceptable acid.

Sedative effects of N-allyl-7-chloro-2,3-dihydro-2-oxo-5-phenyl-1H-1,4-benzodiazepine-1-carboxamide are shown by the following tests in mice:

Chimney test: [Med. Exp. 4, 11 (1961)]: The effective intraperitoneal dosage for 50 percent of mice ($ED_{50}$) is 0.8 mg./kg. The test determines the ability of mice to back up and out of a vertical glass cylinder within 30 seconds. At the effective dosage, 50 percent of the mice failed doing it.

Dish test: Mice in Petri dishes (10 cm. diameter, 5 cm. high, partially embedded in wood shavings), climb out in a very short time when not treated. Mice remaining in the dish for more than 3 minutes indicates tranquilization. $ED_{50}$ equals the dose of test compound at which 50 percent of the mice remain in the dish. The $ED_{50}$ (intraperitoneal administration) in this test was 0.8 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is about 0.8 mg. mg./kg.

Nicotine antagonism test: Mice in a group of 6 are injected with the test compound N-allyl-7-chloro-2,3-dihydro-2-oxo-5-phenyl-1H-1,4-benzodiazepine-1-carboxamide. 30 minutes later the mice including control (untreated) mice are injected with nicotine salicylate (2 mg./kg.). The control mice show overstimulation, i.e., (1) running convulsions followed by (2) tonic extensor fits: followed by (3) death. An intraperitoneal dosage of 0.18 mg./kg. of the test compound protected 50 percent of the mice against (2) and (3).

Antagonism to Strychnine (as sulfate): The effective dosage $ED_{50}$ of N-allyl-7-chloro-2,3-dihydro-2-oxo-5-phenyl-1H-1,4-benzodiazepine-1-carboxamide is 5.6 mg./kg. orally in mice. The test consists in orally administering into groups of 6 mice the test compound, N-allyl-7-chloro-2,3-dihydro-2-oxo-5-phenyl-1H-1,4-benzodiazepine-1-carboxamide, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice. The following compounds have (by intraperitoneal injection) $ED_{50}$ as shown in the table below:

| COMPOUND | ED₅₀ (in mg./kg.) | | | |
|---|---|---|---|---|
| | Ch | D | P | Ni |
| N-allyl-7-cyano 2,3-dihydro-2-oxo-5-phenyl-1H-1,4-benzodiazepine 1-carboxamide | 16 | 6.3 | 9 | 4.5 |
| N-crotyl-7-chloro-2,3-dihydro-2-oxo-5-phenyl-1H-1,4-benzodiazepine-1-carboxamide | 3.1 | 2 | 4 | 1.6 |
| N-(2-chloroethyl)-7-chloro-2,3-dihydro-2-oxo-5-phenyl-1H-1,4-benzodiazepine-1-carboxamide | 76.3 | 3.5 | 4 | 0.3 |
| 7-chloro-N-cyclopropyl-2,3-dihydro-2-oxo-5-phenyl-1H-1,4-benzodiazepine-1-carboxamide | 7 | 2.8 | 7 | 3 |
| 7-chloro-N-cyclohexyl-2,3-dihydro-2-oxo-5-phenyl-1H-1,4-benzodiazepine-1-carboxamide | 28 | 159 | 7200 | 8.4 |

Ch = Chimney Test
D = Dish test
P = Pedestal test
Ni = Nicotine Antagonism (3) test The pharmaceutical forms contemplated by this invention include pharmaceutical compositions suited for oral, parenteral, and rectal use, e.g., tablets, coated and uncoated, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oils, e.g., coconut oil, sesame oil, safflower oil, cottonseed oil, peanut oil, may be used for preparing solutions or suspensions of the active drug. Sweetening, coloring and flavoring agents may be added.

For mammals and birds, food premixes, with starch, oatmeal, dried fishmeat, fishmeal, flour and the like can be prepared.

As tranquilizer the compounds of formula II can be used in dosages of 0.2 mg. to 20 mg./kg. in oral or injectable preparations as described above, o alleviate tension and anxiety in mammals, or birds, such as e.g., occurs when animals are in travel.

Other acid addition salts of the compounds of formula II can be made, such as the flurosilicic acid addition salts, which are useful mothproofing compounds or the trichloroacetates useful as herbicides against Johnson grass, Bermuda grass, yellow foxtail and green foxtail, and quack grass.

The starting materials of formula I of this invention, substituted or unsubstituted 1,3-dihydro- 5-phenyl-2H-1,4-benzodiazepin-2-ones, are known. The following compounds of formula I are representative starting materials.

1,3-dihydro-5-phenyl-2H-1,4-benzodiazepin-2-one;
6chloro-1,3-dihydro-5-(m-bromophenyl)-2H-1,4-benzodiazepin-2-one;
7-chloro-1,3-dihydro-5-phenyl-2H-1,4-benzodiazepin-2-one;
8-chloro-1,3-dihydro-5-phenyl-2H-1,4-benzodiazepin-2-one;
7-bromo-1,3-dihydro-5-phenyl-2H-1,4-benzodiazepin-2-one;
7-nitro-1,3-dihydro-5-phenyl-2H-1,4-benzodiazepin-2-one;
7-chloro-1,3-dihydro-5-(3,4-dimethylphenyl)-2H-1,4-benzodiazepin-2-one;
1,3-dihydro-5-(2-methyl-4-chlorophenyl)-2H-1,4-benzodiazepin-2-one;
9-bromo-1,3-dihydro-5-phenyl-2H-1,4-benzodiazepin-2-one;
7-methyl-1,3-dihydro-5-phenyl-2H-1,4-benzodiazepin-2-one;
9-nitro-1,3-dihydro-5-phenyl-2H-1,4-benzodiazepin-2-one;
7-fluoro-1,3-dihydro-5-phenyl-2H-1,4-benzodiazepin-2-one;
7-trifluoromethyl-1,3-dihydro-5-phenyl-2H-1,4-benzodiazepin-2-one;
9-trifluoromethyl-1,3-dihydro-5-phenyl-2H-1,4-benzodiazepin-2-one;
8-cyano-1,3-dihydro-5-phenyl-2H-1,4-benzodiazepin-2-one;
9-cyano-1,3-dihydro-5-[p-(trifluoromethyl)phenyl]-2H-1,4-benzodiazepin-2-one;
7,9-dichloro-1,3-dihydro-5-(o-chlorophenyl)-2H-1,4-benzodiazepin-2-one;
6,8-dichloro-1,3-dihydro-5-(o-fluorophenyl)-2H-1,4-benzodiazepin-2-one;
7-iodo-1,3-dihydro-5-(o-fluorophenyl)-2H-1,4-benzodiazepin-2-one;
3-methyl-1,3-dihydro-5-(o-fluorophenyl)-2H-1,4-benzodiazepin-2-one;
7-fluoro-1,3-dihydro-5-(o-fluorophenyl)-2H-1,4-benzodiazepin-2-one;
3-methyl-1,3-dihydro-5-(p-fluorophenyl)-2H-1,4-benzodiazepin-2-one;
7-nitro-1,3-dihydro-5-(2,4-diodophenyl)-2H-1,4-benzodiazepin-2-one;
7,8-dinitro-1,3-dihydro-5-(o-chlorophenyl)-2H-1,4-benzodiazepin-2-one;
7-bromo-1,3-dihydro-5-(o-bromophenyl)-2H-1,4-benzodiazepin-2-one;
7-methyl-1,3-dihydro-5-(3,5-dichlorophenyl)-2H-1,4-benzodiazepin-2-thione;
7-cyano-1,3-dihydro-5-(2,4-dibromophenyl)-2H-1,4-benzodiazepine-2-one;
3,6,8-trimethyl-1,3-dihydro-5-(o-chlorophenyl)-2H-1,4-benzodiazepin-2-one;
7-trifluoromethyl-1,3-dihydro-5-(o-chlorophenyl)-2H-1,4-benzodiazepin-2-one;
6,7-difluoro-1,3-dihydro-5-(o-chlorophenyl)-2H-1,4-benzodiazepin-2-one;
6-ethyl-1,3-dihydro-5-(2,4-dipropylphenyl)-2H-1,4-benzodiazepin-2-one;
6,8-diethyl-1,3-dihydro-5-(m-ethylphenyl)-2H-1,4-benzodiazepin-2-one;
3-propyl-6-nitro-1,3-dihydro-5-(o-cyanophenyl)-2H-1,4-benzodiazepin-2-one;
and the like.

In carrying out the process of the invention a selected 1,3-dihydro-5-phenyl-2H-1,4-benzodiazepin-2-one (I) in an inert organic solvent, e.g., diethylene glycol, benzene, toluene, xylene, cyclohexane, and preferably in an ether e.g., tetrahydrofuran, diethyl ether, dipropyl ether, dibutyl ether, is reacted with the selected isocyanate. The isocyanates selected include allyl, crotyl, 3-pentenyl, 3-hexenyl, 4-heptenyl, 4-octenyl, 2-chloroethyl, 2-bromoethyl, cyclopropyl, cyclobutyl, cyclopentyl, cyclohexyl isocyanates, and the like. In the preferred embodiment of this invention he reaction is carried out in a nitrogen atmosphere, at the reflux temperature of the mixture but not higher than 125° C. and with the selected isocyanate in excess i.e., from 5–15 times the stoichiometrically required amount. When the reaction is terminated, the mixture is evaporated preferably in vacuo and the resulting product is purified by conventional procedures e.g., extraction, recrystallization, chromatography, and the like.

The following examples are illustrative of the process and products of the present invention.

EXAMPLE 1

N-Allyl-7-chloro-2,3-dihydro-2-oxo-5-phenyl-1H-1,4-benzodiazepine-1-carboxamide

A solution of 5.42 g. (0.02 mole) of 7-chloro-1,3-dihydro-5-phenyl-2H-1,4-benzodiazepin-2-one and 11.7 ml. (16.6 g., 0.2 mole) of allyl isocyanate in 75 ml. of tetrahydrofuran, under nitrogen, was stirred under reflux for 21.5 hours. The solution as evaporated to dryness in vacuo and purged with toluene giving a yellow gum. This gum was dissolved in 100 ml. of 2-propanol, filtered hot, concentrated to 50 ml. and cooled giving 4.76 g. (67.5 percent) of white silky needles of N-allyl-7-chloro-2,3-dihydro-2-oxo-5-phenyl-1H-1,4-benzodiazepine-1-carboxamide of melting point 102°–105°C.

Anal. calcd. for $C_{19}H_{16}ClN_3O_2$: C, 64.52; H, 4.56; Cl, 9.99; N, 11.88.

Found: C, 64.47; H, 4.77; Cl, 9.96; N, 12.03.

EXAMPLE 2

7-Chloro-1-(2-chloroethylcarbamoyl)-1,3-dihydro-5-phenyl-2H-1,4-benzodiazepin-2-one A solution of 5.42 g. (.02 mole) of 7-chloro-1,3-dihydro-5-phenyl-2H-1,4-benzodiazepin-2-one, and 7.4 g. (0.07 mole) of 2-chloroethyl isocyanate in 75 ml. of tetrahydrofuran under nitrogen was stirred at room temperature for 89 hours and then under reflux for 96 hours more. More 2-chloroethylisocyanate (total 25 g.) was added from time to time. The solution was evaporated in vacuo finally with high vacuum pump giving 8.0 g. of a gum. This gum was chromatographed on 800.0 g. of silica and eluted with 50 percent ethyl acetate in cyclohexane. There were collected thirty-one 100-ml. fractions. Fractions 13–17 gave a yellow solid on evaporation, which was recrystallized from 2-propanol yielding 2.5 g. (33 percent) of white crystals of 7-chloro-1-(2-chloroethylcarbamoyl)-1,3-dihydro-5-phenyl-2H-1,4-benzodiazepin-2-one of melting point 110°–112°C.

Anal. calcd. for $C_{18}H_{15}Cl_2N_3O_2$: C, 57.44; H, 3.98; Cl, 18.88; N, 11.17.

Found: C, 57.70; H, 3.91; Cl, 19.09; N, 11.17.

EXAMPLE 3

7-Chloro-N-crotyl-2,3-dihydro-2-oxo-5-phenyl-1H-1,4-benzodiazepin-1-carboxamide

A solution of 5.42 g. (0.02 mole) of 7-chloro-1,3-dihydro-5-phenyl-2H-1,4-benzodiazepin-2-one and 9.45 g. (0.0973 mole) of crotyl isocyanate in 75 ml. of tetrahydrofuran was stirred under reflux under nitrogen for 84 hours. The solution was evaporated to dryness in vacuo (finally with a high vacuum pump) at 60° C. giving a light yellow gum or glass. This material was dissolved in chloroform, mixed with 10 g. of silica, evaporated and placed on a column of 500.0 g. of silica wet with benzene. The column was eluted with 44–100 ml. portions of 5 percent methanol in benzene. Fractions 29–33, inclusive, were combined and evaporated to dryness (weight 5.7 g.). This was boiled with cyclohexane, filtered from starting material and evaporated to a small volume giving a crystalline solid on standing. The fractional crystallization from cyclohexane was repeated twice more giving 1.7 g. (23 percent) of white crystals of 7-chloro-N-crotyl-2,3-dihydro-2-oxo-5-phenyl-1H-1,4-benzodiazepine-1-carboxamide of melting point 114°–116°C.

Anal. Calcd. for $C_{20}H_{18}ClN_3O_2$: C, 65.31; H, 4,93; Cl, 9.64; n, 11.42.

Found: C, 65.46; H, 4,87; Cl, 9.68; N, 11.11.

EXAMPLE 4

N-Allyl-7-cyano-2,3-dihydro-2-oxo-5-phenyl-1H-1,4-benzodiazepine-1-carboxamide

A mixture of 2.1 g. (0.01 mole) of 7-cyano-1,3-dihydro-5-phenyl-2H-1,4-benzodiazepin-2-one, 5.8 ml. of allyl isocyanate, and 50 ml. of tetrahydrofuran was heated under reflux under nitrogen with stirring. The solid soon dissolved From time to time more allylisocyanate was added until a total of about 40 ml. had been added. After 68 hours refluxing and 3 days of standing at room temperature, about 22°–25° C., only a trace of starting material remained. The solution was evaporated to dryness in vacuo and toluene was added and evaporated giving a crystalline solid residue. This residue was dissolved in 100 ml. of 2-propanol, filtered hot and concentrated to 70 ml. After cooling, the resulting crystals were collected and dried yielding 2.6 g. (75 percent) of yellow crystals of N-allyl-7-cyano-2,3-dihydro-2-oxo-5-phenyl-1H-1,4-benzodiazepine-1-carboxamide of melting point 137.5°– 139°C. (dec.).

Anal. Calcd. for $C_{20}H_{16}N_4O_2$: C, 69.74; H, 4.68; N, 16.27.

Found: C, 69.55; H, 4.61; N, 16.66.

EXAMPLE 5

7-Chloro-N-cyclopropyl-2,3-dihydro-2-oxo-5-phenyl-1H-1,4-benzodiazepine-1-carboxamide.

A. Cyclopropyl isocyanate

A suspension of 35.8 g. (0.55 mole) of dried sodium azide in 200 ml. of triethylene glycol dimethyl ether (triglyme) in a 1 l. flask fitted with a stirrer, thermometer, dropping funnel and a Vigreux column to which was attached a Dry Ice-cooled, two-necked flask, was cooled to about 5° and 52.25 g. (0.5 mole) of cyclopropyl carbonyl chloride (b. p. 100°–117° C.) was added dropwise under nitrogen during 10 minutes at 0°–5° C. After stirring at 0° to 25° C. for 1 hour, the mixture was slowly heated by a water bath. At about 55° C. nitrogen started to come off and it was evolved rapidly at 70°–103° C. The flask was then heated by an oil bath up to 171° C. and the product was distilled at 56 mm Hg. The distillate was redistilled through a 7 feet (one-eighth inch helices packed) column giving 25.67 g. (62 percent) cyclopropyl isocyanate as a liquid of boiling point 87° C. (atm. press.); $n_D^{26}$ 1.4210; $d_4^{24}$ 1.00.

Anal. Calcd. for $C_4H_5NO$: C, 57.82; H, 6.07; N, 16.86.

Found: C, 57.02; H, 6.06; N, 17.00.

B. 7-Chloro-N-cyclopropyl-2,3-dihydro-2-oxo-5-phenyl-1H-1,4-benzodiazepine-1-carboxamide A solution of 4.07 g. (0.015 mole) of 7-chloro-1,3-dihydro-5-phenyl-1H-1,4-benzodiazepin-1-one and 15 g. (15 ml.; 0.18 mole) of cyclopropyl isocyanate (added in three portions at start, 1 day and 3 days) was stirred under nitrogen under reflux for 5 days. The solution was evaporated to dryness in vacuo, toluene was added and evaporated giving a gum. This was placed on a column of 500 g. of silica and eluted with 1 percent methanol in chloroform. Column fractions 23 to 26 (100 ml. each) were combined, evaporated and recrystallized from cyclohexane, then from 2-propanol giving 1.7 g. (32 percent) of white crystals of 7-chloro-N-cyclopropyl- 2,3-dihydro-2-oxo-5-phenyl-1H-1,4-benzodiazepin-1-carboxamide of melting point 142°–144° C. decomp. with foaming; the melt resolidified at about 146° and remelted at 211°–213°. An analytical sample melted at 146°–148° C. and remelted at 213.5°–214.5° C.

Anal. calcd. for $C_{19}H_{16}ClN_3O_2$: C, 64.50; H, 4.56; Cl, 10.02; N, 11.88.

Found. C, 64.42; H, 4.49; Cl, 10.13; N, 11.81.

EXAMPLE 6

7-Chloro-N-cyclohexyl-2,3-dihydro-2-oxo-5-phenyl-1H-1,4-benzodiazepine-1-carboxamide A solution of 5.42 g. (0.02 mole) of 7-chloro-2,3-dihydro-5-phenyl-1H-1,4-benzodiazepin-2-one and 9.77 g. (0.078 mole) (10 ml.) of cyclohexyl isocyanate in 50 ml. of tetrahydrofuran was stirred under reflux for 6 days. After 1 day, 2 days, 3 days, and 4 days 10 ml. more cyclohexylisocyanate was added. The mixture was evaporated to dryness in vacuo at <1 mm. Hg. Xylene was added and evaporated in vacuo. The residue was dissolved in 185 ml. of 2-propanol and filtered hot; the resulting filtrate was cooled giving 3.65 g. (46 percent) of pale yellow crystals of 7-chloro-N-cyclohexyl-2,3-dihydro-2-oxo-5-phenyl-1H-1,4-benzodiazepine-1-carboxamide of melting point 134.5°–136° C.

Anal. calcd. for $C_{22}H_{22}ClN_3O_2$: C, 66.75; H, 5.60; Cl, 895; N, 10.61.

Found: C, 66.71; H, 5.64; Cl, 9.12; N, 10.66.

EXAMPLE 7

N-(3-Pentenyl)-7-methyl-2,3-dihydro-2-oxo-5-phenyl-1H-1,4-benzodiazepine-1-carboxamide In the manner given in Example 1, 1,3-dihydro-7-methyl-5-phenyl-2H-1,4-benzodiazepin-2-one can be heated in tetrahydrofuran solution with 3-pentenyl isocyanate to give, N-(3-pentenyl)-7-methyl-2,3-dihydro-2-oxo-5-phenyl-1H-1,4-benzodiazepine-1-carboxamide.

EXAMPLE 8

N-(3-Hexenyl)-7,9-dichloro-2,3-dihydro-2-oxo-5-(o-chlorophenyl)-1H-1,4-benzodiazepine-1-carboxamide In the manner given in Example 1, 1,3-dihydro-7,9-dichloro-5-(o-chlorophenyl)-2H-1,4-benzodiazepin-2-one can be heated in tetrahydrofuran solution with 3-hexenyl siocyanate to give N-(3-hexenyl)-7,9-dichloro-2,3-dihydro-2-oxo-5-(o-chlorophenyl)-1H-1,4-benzodiazepine-1Carboxamide.

EXAMPLE 9

N-(4-octenyl)-7-fluoro-2,3-dihydro-2-oxo-5-(o-fluorophenyl)-1H-1,4-benzodiazepine-1-carboxamide In the manner given in Example 1, 1,3-dihydro-7-fluoro-5-(o-fluorophenyl)-2H-1,4-benzodiazepine-2-one can be heated in tetrahydrofuran solution with 4-octenyl isocyanate to give N-(4-octenyl)-7-fluoro-2,3-dihydro-2-oxo-5-(o-fluorophenyl)-1H-1,4-benzodiazepine-1-carboxamide.

EXAMPLE 10

8-Cyano-1-(3-chloropropylcarbamoyl)-1,3-dihydro-2-oxo-5-phenyl-1H-1,4-benzodiazepin-2-one In the manner given in Example 2, 1,3-dihydro-8-cyano-5-phenyl-2H-1,4-benzodiazepin-2-one can be heated in tetrahydrofuran solution with 3-chloropropyl isocyanate to give 8-cyano-1-(3-chloropropylcarbamoyl)-1,3-dihydro-2-oxo-5-phenyl-1H-1,4-benzodiazpin-2-one.

EXAMPLE 11

7-Iodo-(4-bromobutylcarbamoyl)-1,3-dihydro-5-(o-fluorophenyl)-1H-1,4-benzodiazepine-2-one In the manner given in Example 2, 1,3-dihydro-7-iodo-5-(o-fluorophenyl)-2H-1,4-benzodiazepin-2-one can be heated in tetrahydrofuran solution with 4-bromobutyl isocyanate to give 7-iodo-(4-bromobutylcarbamoyl)-1,3-dihydro-5 -(o-fluorophenyl)-1H-1,4-benzodiazepin-2-one.

EXAMPLE 12

7-Trifluoromethyl-(4-chloropentylcarbamoyl)-2,3-dihydro-5-(o-chlorophenyl)-1H-1,4-benzodiazepin-2-one In the manner given in Example 2, 1,3-dihydro-7-trifluoromethyl-5-(o-chlorophenyl)-2H-1,4-benzodiazepin-2-one can be heated in tetrahydrofuran solution with 4-chloropentylcarbamoyl)-2,3-dihydro-5-(o-chloropentyl)-1H-1,4-benzodiazepin-2-one.

EXAMPLE 13

6,8-Diethyl-(6-iodohexylcarbamoyl)-2,3-dihydro-5-(m-ethylphenyl)-1H-1,4-benzodiazepin-2-one.

In the manner given in Example 2, 1,3-dihydro-6,8-diethyl-5-(m-ethylphenyl)-2H-1,4-benzodiazepin-2-one can be heated in tetrahydrofuran solution with 6-iodohexyl isocyanate to give 6,8-diethyl-(6-iodohexylcarbamoyl)-2,3-dihydro-5-(m-ethylphenyl)-1H-1,4-benzodiazepin-2-one.

EXAMPLE 14

N-crotyl-7-bromo-2,3-dihydro-2-oxo-5-phenyl-1H-1,4-benzodiazepine-1-carboxamide.

In the manner given in Example 1, 1,3-dihydro-7-bromo-5-phenyl-2H-1,4-benzodiazepin-2-one can be heated in tetrahydrofuran solution with crotyl isocyanate to give N-crotyl-7-bromo-2,3-dihydro-2-oxo-5-phenyl-1H-1,4benzodiazepine-1-carboxamide.

EXAMPLE 15

[(5-Bromohex-2-yl)carbamoyl]-3-methyl-2,3-dihydro-2-oxo-5-(o-fluorophenyl)-1H-1,4-benzodiazepin-2-one In the manner given in Example 2, 1,3-dihydro-3-methyl-5-(o-fluorophenyl)-2H-1, -benzodiazepin-2-one can be heated in tetrahydrofuran solution with (5-bromohex-2-yl) isocyanate to give [(5-bromohex-2-yl)carbamoyl]-3-methyl-2,3-dihydro-2-oxo-5-phenyl-1H-1,4-benzodiazepin-2-one.

EXAMPLE 16

N-cyclopropyl-6,7-difluoro-2,3-dihydro-2-oxo-5-(o-chlorophenyl)-1H-1,4-benzodiazepine-1-carboxamide In the manner given in Example 5, 1,3-dihydro-6,7-difluoro-5-(o-chlorophenyl)-2H-1,4-benzodiazepin-2-one can be heated in tetrahydrofuran solution with cyclopropyl isocyanate to give N-cyclopropyl-6,7-difluoro-2,3-dihydro 2-oxo-5-(o-chlorophenyl)-1H-1,4-benzodiazepin3-1-carboxamide.

EXAMPLE 17

6,8-diethyl-1-(3-chloropentylcarbamoyl)-2,3-dihydro-2-oxo-5-(m-ethylphenyl)-1H-1,4-benzodiazepin-2-one.

In the manner given in Example 2, 1,3-dihydro-6,8-diethyl-5-(m-ethylphenyl)-2H-1,4-benzodiazepin-2-one can be heated in tetrahydrofuran solution with 3-chloropentyl isocyanate to give 6,8-diethyl-1-(3-chloropentylcarbamoyl)-2,3-dihydro-2-oxo-5-(m-ethylphenyl)-1H-1,4-benzodiazepine-2-one.

In the manner given in the preceding examples, other 2,3-dihydro-2-oxo-5-phenyl-1,4-benzodiazepin-1-carboxamide of formula II can be obtained by reacting a 1,3-dihydro-5-phenyl-2H-1,4-benzodiazepin-2-one I with a alkenyl, haloalkyl ro cycloalkyl isocyanate as described. Representative compounds thus prepared, include:

N-allyl-3-propyl-6-nitro-2,3-dihydro-2-oxo-5-(o-cyanophenyl)-1H-1,4-benzodiazepine-1-carboxamide;

N-(3-hexenyl)-3,6,8-trimethyl-2,3-dihydro-2-oxo-5-(o-chlorophenyl)-2H-1,4-benzodiazepine-1-carboxamide;

N-(3-heptenyl)-7-chloro-2,3-dihydro-2-oxo-5-(3,4-dimethylphenyl)-1H-1,4-benzodiazepine-1-carboxamide;

N-(3-octen-6-yl)-7-trifluoromethyl-2,3-dihydro-2-oxo-5-phenyl-1H-1,4-benzodiazepine-1-carboxamide;

N-cyclopropyl-7-fluoro-2,3-dihydro-2-oxo-5-phenyl-1H-1,4-benzodiazepine-1-carboxamide;

N-cyclobutyl-8-cyano-2,3-dihydro-2-oxo-5-phenyl-1H-1,4-benzodiazepine-1-carboxamide;

N-cyclohexyl-9-cyano-2,3-dihydro-2-oxo-5-phenyl-[p-trifluoromethylphenyl]-1H-1,4-benzodiazepine-1-carboxamide;

N-cyclopentyl-2,3-dihydro-2-oxo-5-phenyl-1H-1,4-benzodiazepine-1-carboxamide;

1-(3-iodobutylcarbamoyl)-7,9-dichloro-2,3-dihydro-2-oxo-5-(o-chlorophenyl)-2H-1,4-benzodiazepin-2-one;

1-(4-fluoropentylcarbamoyl)-3-methyl-1,3-dihydro-2-oxo-5-(o-fluorophenyl)-2H-1,4-benzodiazepin-2-one;

and the like.

I claim:

1. A 2,3-dihydro-2-oxo-5-phenyl-1H-1,4-benzodiazepin-1-carboxamide of the formula (II):

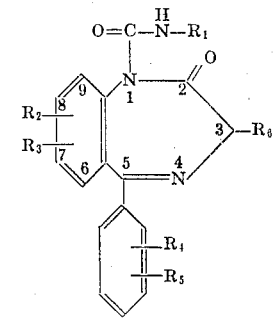

wherein $R_1$ is selected from the group consisting of alkenyl of three to eight carbon atoms, inclusive, cycloalkyl of three to six carbon atoms, inclusive, and haloalkyl in which the alkyl group is of two to six carbon atoms, inclusive, nd the halogen is fluorine, chlorine, bromine, or iodine; wherein $R_2$, $R_3$, $R_4$, and $R_5$ are selected from the group consisting of hydrogen, alkyl of one to three carbon atoms, inclusive, fluorine, chlorine, bromine, cyano, and trifluoromethyl; and wherein $R_6$ is hydrogen or alkyl of one to three, carbon atoms, inclusive, and the pharmacologically acceptable addition salts thereof.

2. N-Allyl-7-chloro-2,3-dihydro-2-oxo-5-phenyl-1H-1,4-benzodiazepine-1-carboxamide.

3. 7-Chloro-N-crotyl-2,3-dihydro-2-oxo-5-phenyl-1H-1,4-benzodiazepine-1-carboxamide.

4. N-allyl-7-cyano-2,3-dihydro-2-oxo-5-phenyl-1H-1,4-benzodiazepine-1-carboxamide.

5. 7-Chloro-N-cyclopropyl-2,3-dihydro-2-oxo-5-phenyl-1H-1,4-benzodiazepine-1-carboxamide.

6. 7-Chloro-N-cyclohexyl-2,3-dihydro-2-oxo-5-phenyl-1H-1,4-benzodiazepine-1-carboxamide.

7. 7-Chloro-1-(2-chloroethylcarbamoyl)-1,3-dihydro-5-phenyl-2H-1,4-benzodiazepin-2-one.

* * * * *